United States Patent
Shaheen

(10) Patent No.: US 8,130,718 B2
(45) Date of Patent: Mar. 6, 2012

(54) METHOD AND SYSTEM FOR INTERWORKING OF CELLULAR NETWORKS AND WIRELESS LOCAL AREA NETWORKS

(75) Inventor: Kamel M. Shaheen, King of Prussia, PA (US)

(73) Assignee: InterDigital Technology Corporation, Wilmington, DE (US)

(*) Notice: Subject to any disclaimer, the term of this patent is extended or adjusted under 35 U.S.C. 154(b) by 592 days.

(21) Appl. No.: 11/285,684

(22) Filed: Nov. 22, 2005

(65) Prior Publication Data
US 2006/0126565 A1    Jun. 15, 2006

Related U.S. Application Data

(60) Provisional application No. 60/634,679, filed on Dec. 9, 2004.

(51) Int. Cl.
*H04W 4/00* (2009.01)

(52) U.S. Cl. ........ 370/331; 455/436; 455/437; 455/438; 455/439; 455/440; 455/441; 455/442; 455/443; 455/444

(58) Field of Classification Search ................... 455/436, 455/437, 438, 439, 440, 441, 442, 443, 444; 370/331
See application file for complete search history.

(56) References Cited

U.S. PATENT DOCUMENTS

| 6,385,451 | B1* | 5/2002 | Kalliokulju et al. ......... 455/437 |
| 6,711,147 | B1 | 3/2004 | Barnes et al. |
| 7,039,027 | B2 | 5/2006 | Bridgelall |
| 7,082,301 | B2 | 7/2006 | Jagadeesan et al. |
| 7,089,005 | B2 | 8/2006 | Reddy |
| 7,245,917 | B2* | 7/2007 | Chiueh ......................... 455/442 |
| 7,251,488 | B2 | 7/2007 | Chitrapu |
| 7,353,027 | B2* | 4/2008 | Karagiannis et al. ......... 455/436 |
| 7,496,068 | B2 | 2/2009 | Chen |
| 2004/0008645 | A1 | 1/2004 | Janevski et al. |

(Continued)

FOREIGN PATENT DOCUMENTS
RU    2295200    3/2007

OTHER PUBLICATIONS

3rd Generation Partnership Project; Technical Specificiation Group Core Network; 3GPP System to Wirless Local Area Network (WLAN) interworking: User Equipment (UE) to network protocol, Sep. 2004, 3GPP TS 24.234 v6.0.0.*

(Continued)

*Primary Examiner* — Rafael Pérez-Gutiérrez
*Assistant Examiner* — Liton Miah
(74) *Attorney, Agent, or Firm* — Volpe and Koenig, P.C.

(57) ABSTRACT

A method and system for interworking between cellular networks and wireless local area networks (WLANs) are disclosed. At least one cellular network, at least one WLAN and an IP network are deployed. A wireless transmit/receive unit (WTRU) first establishes a connection to a WLAN and a tunnel between an access point (AP) and a packet data gateway (PDG) is established. The PDG further establishes a tunnel to an IP network. The WTRU then invokes a service which is delivered through the WLAN. As signal quality from the AP degrades below a predetermined threshold, a handover from the WLAN to the cellular network is performed. A new connection to the cellular network may be established either before or after breaking the current connection to the WLAN or the two connections may be maintained simultaneously.

10 Claims, 7 Drawing Sheets

U.S. PATENT DOCUMENTS

| | | | |
|---|---|---|---|
| 2004/0028009 A1* | 2/2004 | Dorenbosch et al. | 370/329 |
| 2004/0066769 A1 | 4/2004 | Ahmavaara et al. | |
| 2004/0105413 A1 | 6/2004 | Menon et al. | |
| 2004/0114553 A1 | 6/2004 | Jiang et al. | |
| 2004/0248615 A1 | 12/2004 | Purkayastha et al. | |
| 2004/0266426 A1* | 12/2004 | Marsh et al. | 455/426.2 |
| 2005/0018637 A1* | 1/2005 | Karoubalis et al. | 370/338 |
| 2005/0130659 A1* | 6/2005 | Grech et al. | 455/436 |
| 2005/0254469 A1 | 11/2005 | Verma et al. | |
| 2005/0265284 A1* | 12/2005 | Hsu et al. | 370/331 |
| 2006/0046728 A1 | 3/2006 | Jung et al. | |
| 2006/0083199 A1* | 4/2006 | Yang | 370/331 |

OTHER PUBLICATIONS

3GPP TS 23.234 V6.5.0. "3$^{rd}$ Generation Partnership Project; Technical Specification Group Services and System Aspects; 3GPP System to Wireless Local Area Network (WLAN) Interworking; System Description." Jun. 2005.

Third Generation Partnership Project, "Technical Specification Group Services and System Aspects; 3GPP system to Wireless Local Area Network (WLAN) interworking; System description (Release 6)," 3GPP TS 23.234 V6.2.0 (Sep. 2004).

Third Generation Partnership Project, "Technical Specification Group Services and System Aspects; 3GPP system to Wireless Local Area Network (WLAN) interworking; System description (Release 6)," 3GPP TS 23.234 V6.6.0 (Sep. 2005).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.10.0 (Sep. 2004).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.14.0 (Sep. 2005).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.4.0 (Sep. 2004).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.8.0 (Sep. 2005).

Third Generation Partnership Project, "Technical Specification Group Core Network and Terminals; IP Multimedia Call Control Protocol based on Session Initiation Protocol (SIP) and Session Description Protocol (SDP); Stage 3 (Release 7)," 3GPP TS 24.229 V7.1.0 (Sep. 2005).

Third Generation Partnership Project, "Technical Specification Group Services and System Aspects; IP Multimedia Subsystem (IMS); Stage 2 (Release 5)," 3GPP TS 23.228 V5.12.0 (Mar. 2004).

Third Generation Partnership Project, "Technical Specification Group Services and System Aspects; IP Multimedia Subsystem (IMS); Stage 2 (Release 5)," 3GPP TS 23.228 V5.140 (Sep. 2004).

Third Generation Partnership Project, "Technical Specification Group Services and System Aspects; IP Multimedia Subsystem (IMS); Stage 2 (Release 6)," 3GPP TS 23.228 V6.7.0 (Sep. 2004).

Third Generation Partnership Project, "Technical Specification Group Services and System Aspects; IP Multimedia Subsystem (IMS); Stage 2 (Release 6)," 3GPP TS 23.228 V6.11.0 (Sep. 2005).

Third Generation Partnership Project, "Technical Specification Group Services and System Aspects; IP Multimedia Subsystem (IMS); Stage 2 (Release 7)," 3GPP TS 23.228 V7.1.0 (Sep. 2005).

Third Generation Partnership Project, "Technical Specification Group Services and System Aspects; Voice Call Continuity between CS and IMS; Stage 2 (Release 7)," 3GPP TS 23.cde V0.1.0 (Sep. 2005).

Third Generation Partnership Project, "Technical Specification Group Core Network and Terminals; Signaling flows for the IP multimedia call control based on Session Initiation Protocol (SIP) and Session Description Protocol (SDP); Stage 3 (Release 5)," 3GPP TS 24.228 V5.13.0 (Jun. 2005).

Third Generation Partnership Project, "Technical Specification Group Core Network and Terminals; Signaling flows for the IP multimedia call control based on Session Initiation Protocol (SIP) and Session Description Protocol (SDP); Stage 3 (Release 5)," 3GPP TS 24.228 V5.10.0 (Sep. 2004).

Third Generation Partnership Project, "Technical Specification Group Core Network; 3GPP System to Wireless Local Area Network (WLAN) interworking; User Equipment (UE) to network protocols; Stage 3 (Release 6)," 3GPP TS 24.234 V6.0.0 (Sep. 2004).

Third Generation Partnership Project, "Technical Specification Group Core Network; 3GPP System to Wireless Local Area Network (WLAN) interworking; User Equipment (UE) to network protocols; Stage 3 (Release 6)," 3GPP TS 24.234 V6.4.0 (Sep. 2005).

Third Generation Partnership Project, "Technical Specification Group Core Network and Terminals; Voice Call Continuity between the Circuit-Switched (CS) domain and the IP Multimedia (IP) Core Network (CN) subsystem; Stage 3 (Release 7)," 3GPP TS 24.206 V0.2.0 (Nov. 2005).

* cited by examiner

METHOD AND SYSTEM FOR INTERWORKING OF CELLULAR NETWORKS AND WIRELESS LOCAL AREA NETWORKS

CROSS REFERENCE TO RELATED APPLICATION

This application claims the benefit of U.S. Provisional Application No. 60/634,679 filed Dec. 9, 2004, which is incorporated by reference as if fully set forth.

FIELD OF INVENTION

The present invention is related to wireless communication systems. More specifically, the present invention is a method and system for interworking between cellular networks and wireless local area networks (WLANs).

BACKGROUND

Different types of wireless communication networks are presently deployed, such as WLANs and cellular networks. A multi-mode wireless transmit/receive unit (WTRU) supports wireless communication in more than one wireless communication network. As a user of the multi-mode WTRU roams between different networks, it is necessary to perform handover from one network to the other while receiving services continuously. For example, a wireless subscriber may roam between a WLAN and a third generation (3G) network while maintaining continuity in the wireless service provided to the user. Therefore, there is a need for coordination between the WTRU and the networks such that the service continuity is maintained as the user roams between different wireless networks.

SUMMARY

The present invention is related to a method and system for interworking between cellular networks and WLANs. At least one cellular network, at least one WLAN and an IP network are deployed. The WLAN includes an access point (AP). The cellular network includes a radio access network and a core network. The radio access network includes a Node-B and a radio network controller, and the core network includes a packet data gateway (PDG), a serving GPRS support node (SGSN) and a gateway GPRS support node (GGSN).

A WTRU first establishes a connection to a WLAN and a tunnel between an AP and a PDG is established. The PDG further establishes a tunnel to an IP network. The WTRU then invokes a service which is delivered through the WLAN. As signal quality from the AP degrades below a predetermined threshold, a handover from the WLAN to the cellular network is performed. A new connection to the cellular network may be established either before or after breaking the current connection to the WLAN or the two connections may be maintained simultaneously.

BRIEF DESCRIPTION OF THE DRAWINGS

A more detailed understanding of the invention may be had from the following description of preferred embodiments, given by way of example and to be understood in conjunction with the accompanying drawings, wherein.

DETAILED DESCRIPTION OF THE PREFERRED EMBODIMENTS

Figure 1:
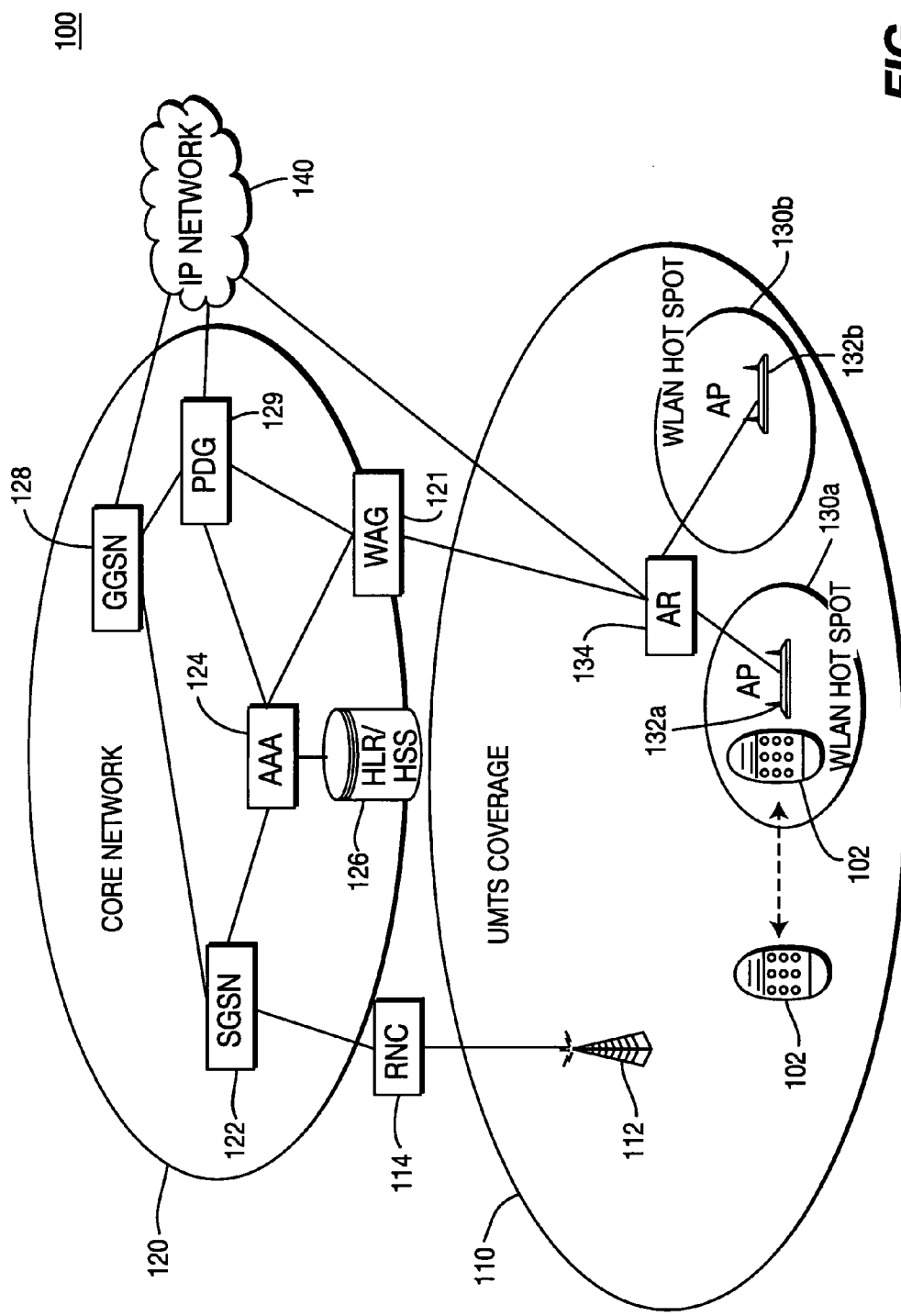
FIG. 1 is a block diagram of a UMTS-WLAN architecture.

The present invention will be described with reference to the drawing figures wherein like numerals represent like elements throughout.

When referred to hereinafter, the terminology "WTRU" includes but is not limited to a user equipment, a mobile station, a fixed or mobile subscriber unit, a pager, or any other type of device capable of operating in a wireless environment. When referred to hereinafter, the terminology "Node-B" and "AP" includes but is not limited to a base station, a site controller or any other type of interfacing device in a wireless environment.

The present invention provides methods for maintaining service continuity and seamless handover between a WLAN and a cellular network by defining steps for establishing the cellular network connectivity, steps for performing a handover, and steps for breaking the connectivity between the user and the WLAN. It should be noted that the cellular network can be any type of cellular network including, but not limited to, a universal mobile telecommunication system (UMTS), cdma2000 and a global system for mobile communication (GSM), and the WLAN can be any type of WLAN including, but not limited to, an IEEE 802.x network.

FIG. 1 is a block diagram of a UMTS-WLAN interworking network 100. WLANs 130a, 130b, (e.g., WLAN hot spots), are deployed in the coverage area of the UMTS 110. Each WLAN 130a, 130b includes at least one AP 132a, 132b for radio access. The AP 132a, 132b is connected to an access router (AR) 134 for access to external networks, such as an IP network 140, (e.g., Internet), or a cellular core network 120 for 3G-based services through the WLAN hotspot.

Base stations 112 are deployed in the UMTS coverage area for access to UMTS networks. The base station 112 is connected to a radio network controller (RNC) 114 which is connected to the cellular core network 120.

The cellular core network 120 comprises a circuit switched core network (not shown) and a packet switched core network (shown in FIG. 1). The packet switched core network 120 comprises an SGSN 122, an authentication, authorization and accounting (AAA) server 124, a home location register (HLR)/home subscriber server (HSS) 126, a GGSN 128, a PDG 129 and a WLAN access gateway (WAG) 121.

Figure 2:
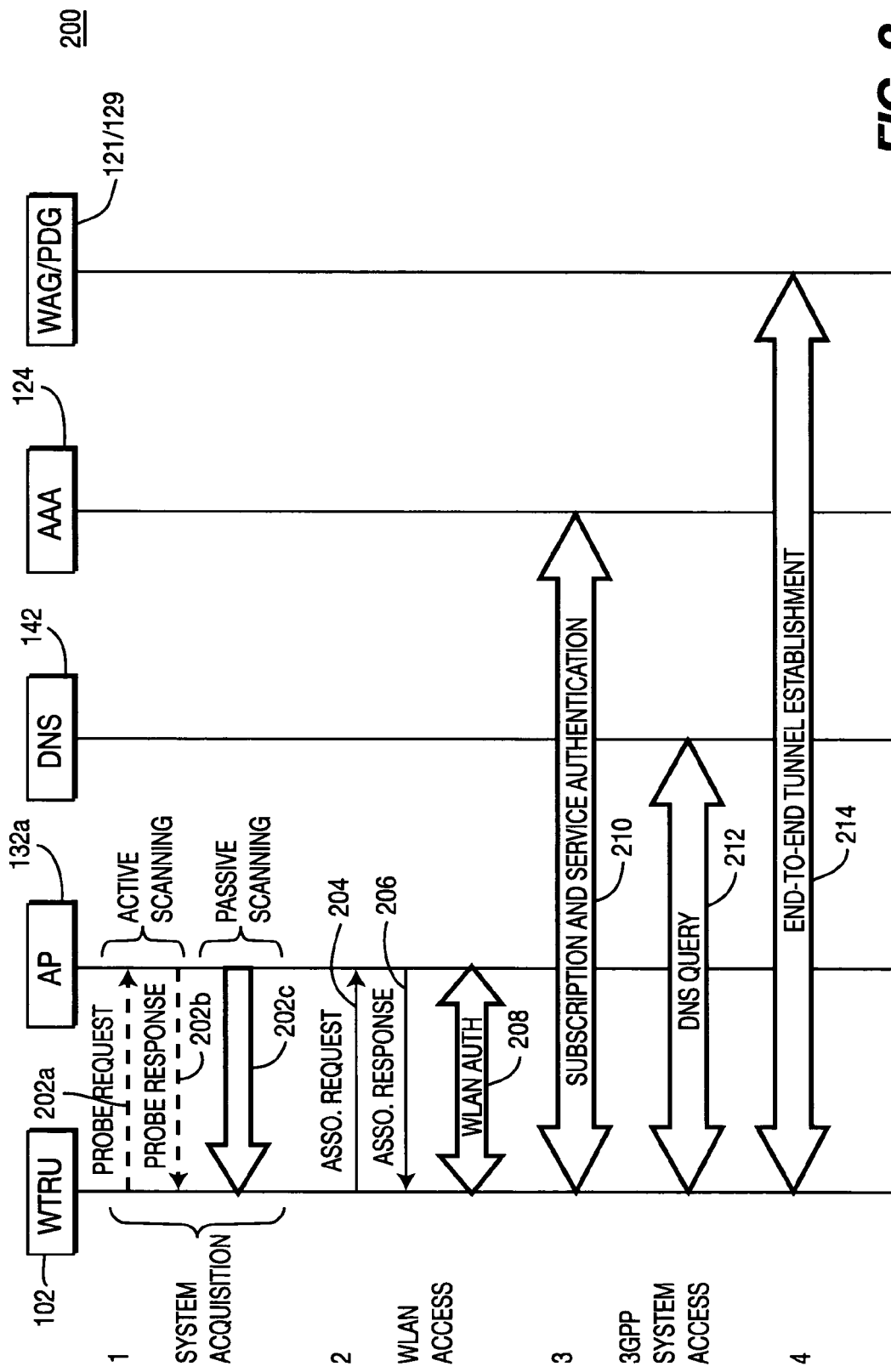
FIG. 2 is a signaling diagram of a process for access to 3G based services through a WLAN.

Referring to FIGS. 1 and 2, a process 200 for access to 3G-based services through WLAN is explained hereinafter. A WTRU 102 is currently in a service area of the WLAN hotspot 130a. The WTRU 102 acquires system information of the WLAN hotspot 130a through active or passive scanning (step 202). In active scanning, the WTRU 102 sends a probe request to the AP 132a and the AP 132a sends a probe response in response to the probe request (steps 202a, 202b). The WTRU 102 may receive beacons from more than one AP. In such case the WTRU typically selects the AP having the strongest signal. In passive scanning, the WTRU 102 listens to the beacon transmitted from the AP 132a periodically (step 202c).

After acquiring the system information, WLAN association and authentication procedures are performed. The WTRU 102 sends an association request message to the selected AP 132a (step 204) and the AP 132a sends an association response message to the WTRU 102 (step 206). At such point, an association is established and WLAN authentication procedure is performed (step 208).

The WTRU 102 then initiates subscription and service authentication procedures by registering with the UMTS network for receiving UMTS-based services through the WLAN 130a (step 210). The WLAN 130a resolves the Network Access Id (NAI) provided by the WTRU 102. The AR 134 uses the NAI to route AAA messages to the relevant AAA server 124 in the UMTS core network 120. The AR 134 triggers extensible authentication protocol (EAP)-authentication key agreement (AKA) authentication and relay messages to a UMTS AAA server 124. Once the WTRU 102 receives an authentication success message, the WTRU 102 uses dynamic host configuration protocol (DHCP) to receive an IP address and then initiates a tunnel establishment with the PDG 129 through the WAG 121. The WTRU 102 constructs a fully qualified domain name (FQDN) and performs a domain name service (DNS) query for the PDG 129 from a DNS 142 (step 212). The WTRU 102 selects a PDG from the received list in the DNS query response and establishes an end-to-end tunnel between the selected PDG 129 and the WTRU 102 (step 214).

Figure 3:
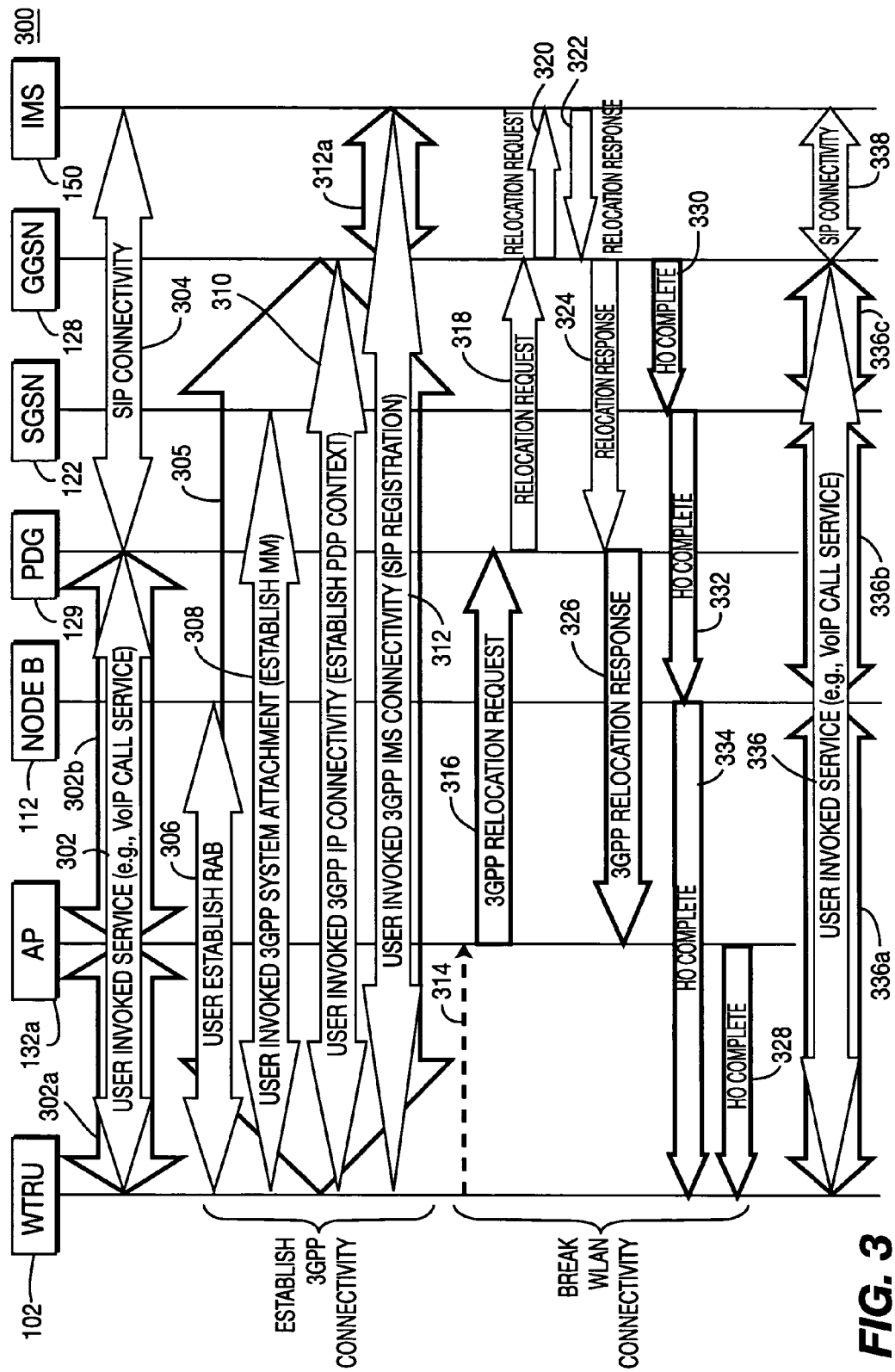
FIG. 3 is a signaling diagram of a process for interworking in accordance with a first embodiment of the present invention.

FIG. 3 is a signaling diagram of a process 300 for interworking in accordance with the first embodiment of the present invention. In accordance with the first embodiment, a new connection to the UMTS network is established before breaking the current connection to the WLAN hotspot, (i.e., "make before break"). When establishing the tunnel at step 214 in FIG. 2, the WTRU indicates an application, such as voice over IP (VoIP) services, and the tunnel is set up for this certain application. The tunnel is established by the WTRU 102 sending a request to the AP 132a (step 302a) and the AP 132a forwarding the request to the PDG 129 (step 302b). After the tunnel between the WTRU 102 and the PDG 129 is established, the WTRU 102 invokes the indicated service (step 302).

There are two options that may follow the indication of the application. One is that a request is sent to the PDG 129 to establish the connection to the IP Multimedia Subsystem (IMS) 150 and allocate the Proxy Call State Control Function (P-CSCF) or the Session Initiation Protocol (SIP) proxy for the WTRU 102. The other option is that a request is sent to the PDG 129 to establish the tunnel and wait for the WTRU 102 to request a connection to the IMS 150 and the allocation of the SIP proxy or the P-CSCF is performed after the request for connection. The first option is preferred since it will save additional delay in setting up the call. However, the second option may be the implementation in certain situations. The step 304 between the PDG 129 and the IMS 150 indicates the steps taking place to establish the connection between the PDG 129 and the IMS 150, such as SIP registration, allocation of P-CSCF and the allocation of Serving CSCF (S-CSCF). A CSCF is a specific type of SIP server, which is used to process SIP signaling packets in an IMS network. A P-CSCF is an SIP proxy that is the first point of contact for the WTRU. An S-CSCF is a central node of the signaling plane.

As the WTRU 102 moves away from the current WLAN hotspot 130a, as shown in FIG. 1, a handover from the current WLAN hotspot 130a to the UMTS network 110 is initiated. In accordance with this embodiment, a new connectivity to the UMTS network 110 is established before breaking the existing connectivity to the current WLAN hotspot 130a.

Referring again to FIG. 3, the WTRU 102 establishes a connection to the GGSN 128 as indicated by arrow 305 by the following steps 306-310. The WTRU 102 first establishes a radio access bearer (RAB) to a Node-B 112 (step 306) and invokes a 3GPP system attachment (step 308). The WTRU 102 then invokes 3GPP IP connectivity by establishing a packet data protocol (PDP) context (step 310). When the WTRU 102 sets up a PDP context, the WTRU 102 selects an access point and an access point name (APN) is determined. The APN is used in a DNS query. This process finally gives an IP address of the GGSN 128 which serves the access point. The WTRU 102 then invokes 3GPP IMS connectivity through SIP registration at step 312 at such point the connection between the GGSN 128 and the IMS 150 is also established as indicated by arrow 312a.

Once the connectivity to the UMTS network 110 is established, a process for breaking the connectivity to the current WLAN hotspot 130a is initiated. The WTRU 102 sends a handover request to the AP 132a (step 314). The handover request identifies the tunnel end points, the user ID, radio resources, frequency channels, priority, or the like. The AP 132a then sends a 3GPP relocation request to the PDG 129 (step 316). There are two options with respect to the 3GPP relocation request. The PDG 129 may be removed from the call path after the connectivity to the WLAN 130a is terminated or the PDG 129 may remain on the call path after the connectivity to the WLAN 130a is terminated. FIG. 3 illustrates the first option and the second option will be explained with reference to FIG. 4 hereinafter.

In the first embodiment shown in FIG. 3, the PDG 129 is removed from the call path after the connectivity to the WLAN 130a is terminated. The PDG 129 forwards the request to the GGSN 128, and the GGSN 128 forwards the request to the IMS 150 (steps 318, 320). The tunnel between the PDG 129 and the GGSN 128 lasts only for the duration the connectivity to the WLAN 130a exists, and then a new connection between the GGSN 128 and the IMS 150 is established and traffic is forwarded directly from the IMS 150 to the GGSN 128 where the WTRU 102 is now connected.

The IMS 150 sends a relocation response to the GGSN 128, which forwards the response to the PDG 129 (steps 322, 324). The PDG 129 sends a relocation response to the AP 132a (step 326). The AP 132a then releases the resources after sending a handover complete message to the WTRU 102 (step 328). The GGSN 128 also sends the handover complete message, (i.e., HO complete), for resource allocation to the Node-B 112 via the SGSN 122 (steps 330, 332). The Node-B 112 then sends the handover complete message to the WTRU 102 (step 334). The services from the IMS 150 are then provided through the UMTS network 110, (i.e., from the IMS 150 via the GGSN 128, the SGSN 122 and the Node-B 112 to the WTRU 102 as indicated by arrows 336a-336c) (steps 336, 338).

Figure 4:
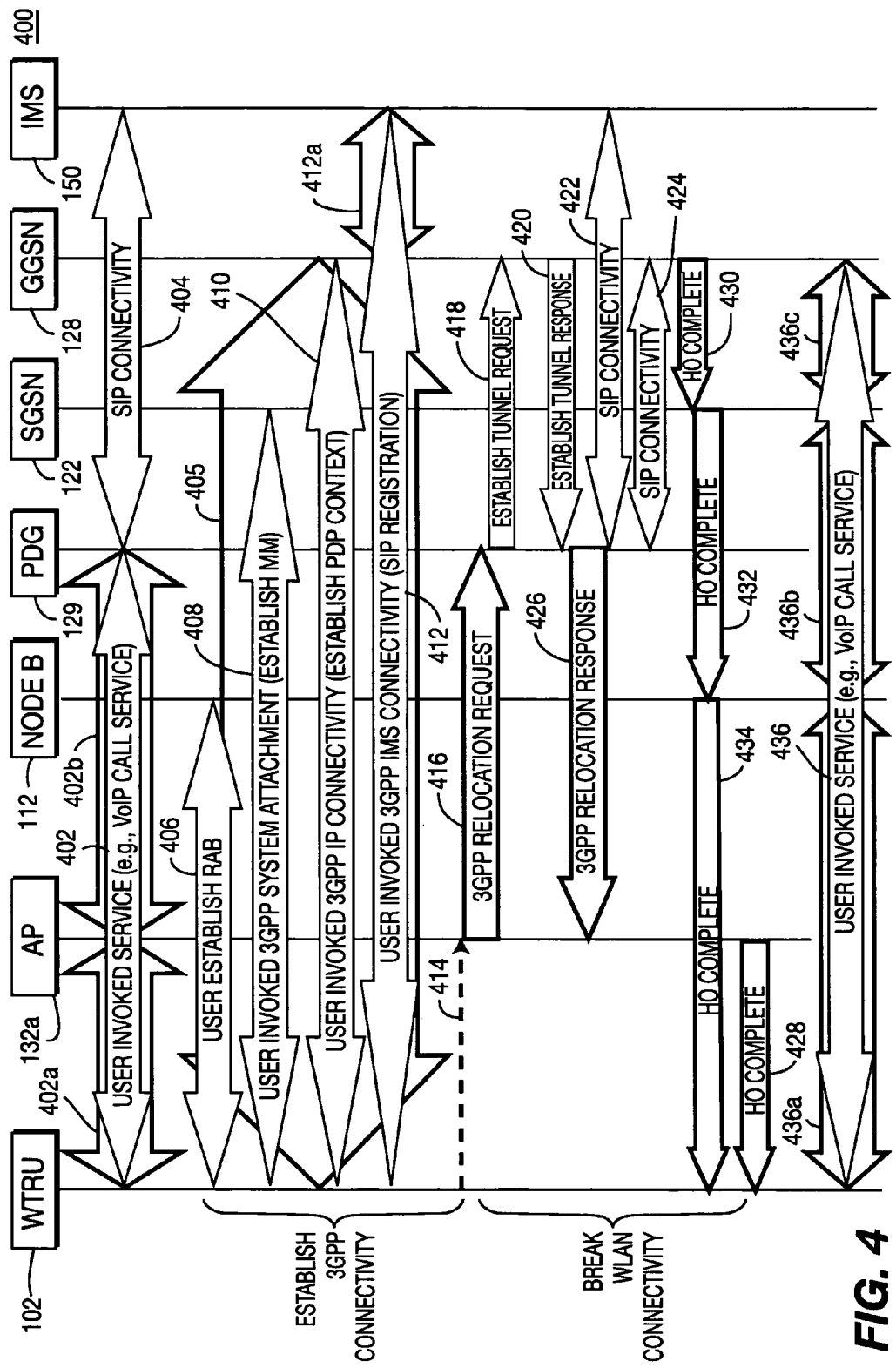
FIG. 4 is a signaling diagram of an alternative process for interworking in accordance with an alternative to the first embodiment of the present invention.

FIG. 4 is a signaling diagram of an alternative process 400 to the first embodiment. Process 400 is similar to process 300 except the PDG 129 remains on the call path after the connectivity to the WLAN 140a is terminated. The PDG 129 will be in the middle of the call path after the handover. The handover is performed by switching the signaling path in the P-CSCF toward the GGSN 128 from the PDG 129. The traffic is directed from the PDG 129 to the GGSN 128.

Steps 402-416 are the same as corresponding steps 302-316 and will not be repeated herein. After receiving the relocation request from the AP 132a, the PDG 129 sends a tunnel establishment request to the GGSN 128 and the GGSN 128 responds with a tunnel establishment response. At such point a tunnel is established between the PDG 129 and the GGSN 128. The GGSN 128 establishes the SIP connectivity to the IMS 150 through the PDG 129 (steps 422, 424). The PDG 129 sends a relocation response to the AP 132a (step 426). The AP 132a then releases the resources after sending a handover complete message to the WTRU 102 (step 428). The GGSN 128 also sends the handover complete message for resource allocation to the Node-B 112 via the SGSN 122 (steps 430, 432). The Node-B 112 then sends the handover complete message to the WTRU 102 (step 434). The services from the IMS 150 are then provided through the UMTS network 110, (i.e., from the IMS 150 via the PDG 129, the GGSN 128, the SGSN 122 and the Node-B 112 to the WTRU 102 as indicated by arrows 436a-436c) (step 436).

Figure 5:
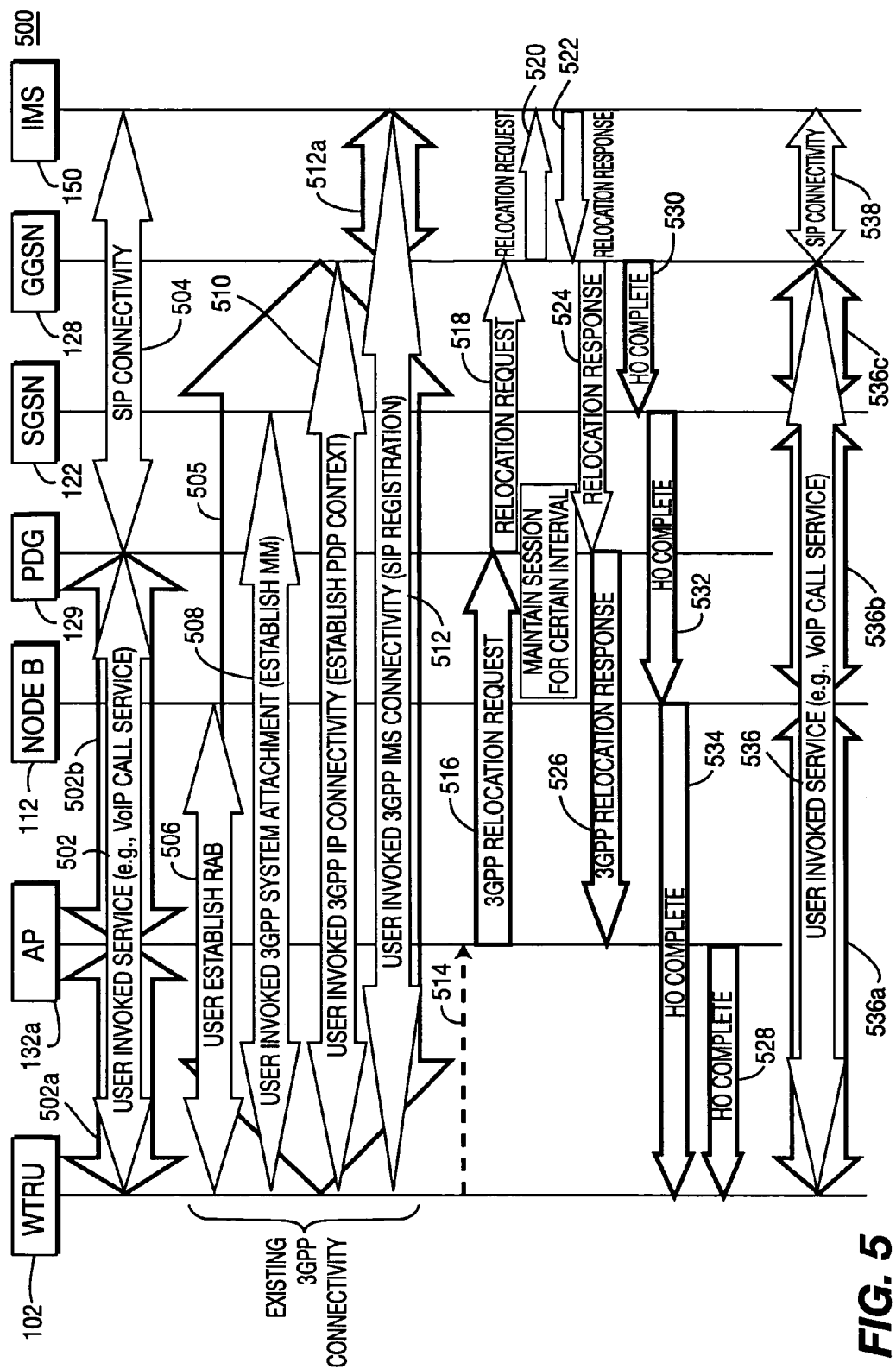
FIG. 5 is a signaling diagram of a process for interworking in accordance with a second embodiment of the present invention.

FIG. 5 is a signaling diagram of a process 500 for interworking in accordance with a second embodiment of the present invention. In accordance with the second embodiment, the WTRU 102 may maintain multiple sessions simultaneously and the existing connectivity to the WLAN 130a is not torn down after the handover is complete. Two connections are maintained simultaneously and the application is transferred from one network to the other, (i.e., "simultaneous").

After the tunnel between the WTRU 102 and the PDG 129 is established, the WTRU 102 invokes a service, such as VoIP call services (step 502). The WTRU 102 sends a request to the AP 132a (step 502a) and the AP 132a forwards the request to the PDG 129 (step 502b). The step 504 between the PDG 129 and the IMS 150 indicates the steps taken place to establish the connection between the PDG 129 and the IMS 150, such as SIP registration, allocation of P-CSCF and the allocation of S-CSCF.

The WTRU 102 establishes an additional connection to the UMTS network 110 concurrently. The WTRU 102 establishes a connection to the GGSN 128 as indicated by arrow 505 by the following steps 506-510. The WTRU 102 establishes an RAB to a Node-B 112 (step 506) and invokes a 3GPP system attachment (step 508). The WTRU 102 then invokes 3GPP IP connectivity by establishing a PDP context (step 510). When the WTRU 102 sets up a PDP context, the WTRU 102 selects an access point and an APN is determined. The APN is used in a DNS query. This process finally gives an IP address of the GGSN 128 which serves the access point. The WTRU 102 then invokes 3GPP IMS connectivity through SIP registration at step 512 at such point the connection between the GGSN 128 and the IMS 150 is also established as indicated by arrow 512a.

As the WTRU 102 moves away from the current WLAN hotspot 130a, as shown in FIG. 1, the application is transferred from the WLAN 130a to the UMTS network 110 without breaking the existing connection to the WLAN 130a. The WTRU 102 sends a handover request to the AP 132a (step 514). The handover request identifies the tunnel end points, the user ID, radio resources, frequency channels, priority, or the like. The AP 132a then sends a 3GPP relocation request to the PDG 129 (step 516). As stated hereinbefore with respect to the first embodiment and its alternative, the PDG 129 may be removed from the call path after the connection is switched to the UMTS or may remain on the call path. FIG. 5 illustrates the first option and the second option will be explained with reference to FIG. 6 hereinafter.

The PDG 129 forwards the request to the GGSN 128, and the GGSN 128 forwards the request to the IMS 150 (steps 518, 520). The PDG 129 is removed from the call path after the connectivity to the WLAN 130a is switched. The tunnel between the PDG 129 and the GGSN 128 lasts only for a certain interval, and a new connection between the GGSN 128 and the IMS 150 is established and traffic is forwarded directly from the IMS 150 to the GGSN 128 where the WTRU 102 is connected.

The IMS 150 sends a relocation response to the GGSN 128, which forwards the response to the PDG 129 (steps 522, 524). The PDG 129 sends a relocation response to the AP 132a (step 526). The AP 132a then releases the resources after sending a handover complete message to the WTRU 102 (step 528). The GGSN 128 also sends the handover complete message for resource allocation to the Node-B 112 via the SGSN 122 (steps 530, 532). The Node-B 112 then sends the handover complete message to the WTRU 102 (step 534). The services from the IMS 150 are then provided through the UMTS network 110, (i.e., from the IMS 150 via the GGSN 128, the SGSN 122 and the Node-B 112 to the WTRU 102 as indicated by arrows 536a-536c) (steps 536, 538).

Figure 6:
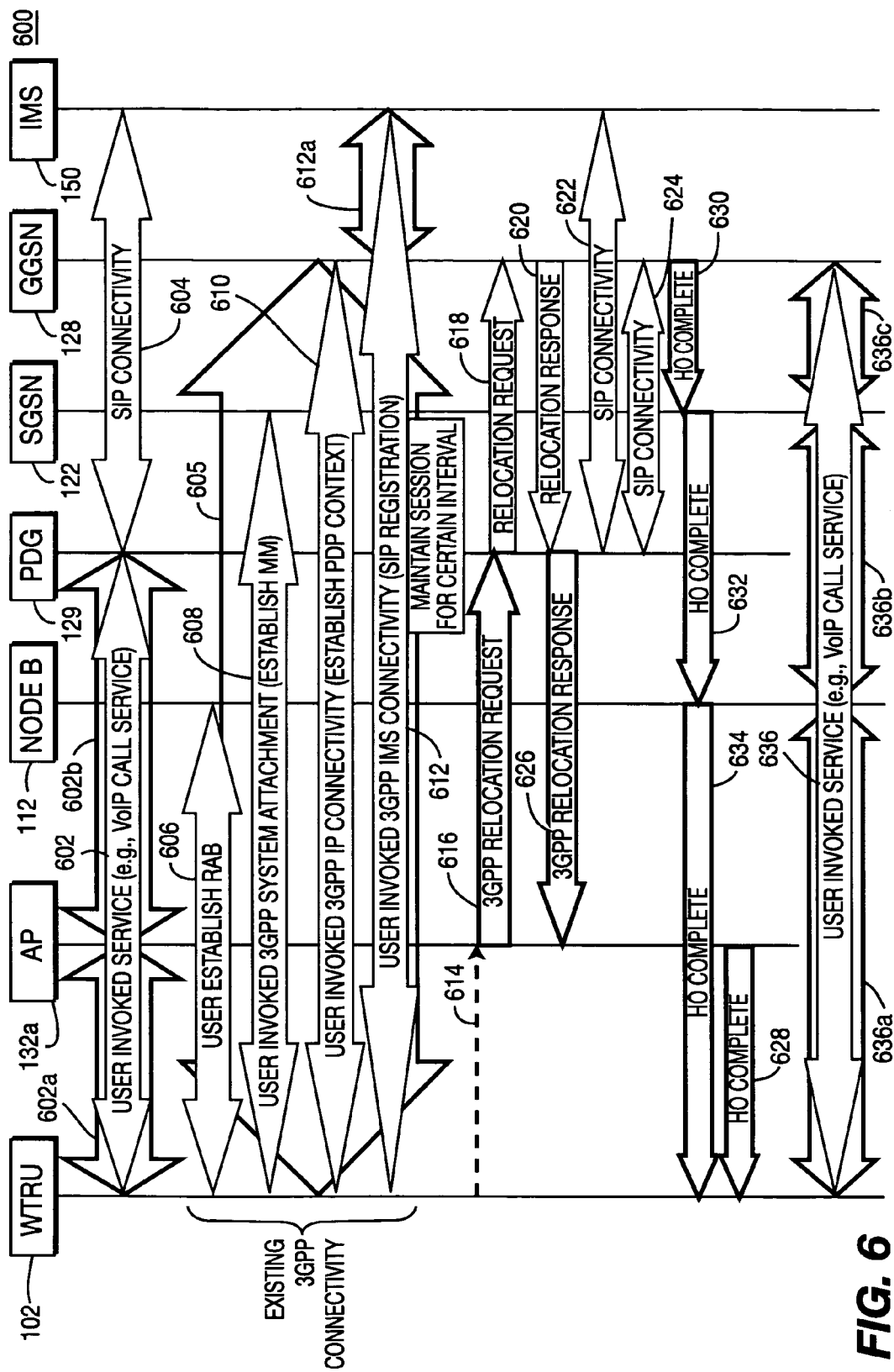
FIG. 6 is a signaling diagram of an alternative process for interworking in accordance with an alternative to the second embodiment of the present invention.

FIG. 6 is a signaling diagram of a process 600 which is an alternative to the second embodiment of the present invention. Process 600 is similar to process 500 except the PDG 129 remains on the call path after the connectivity to the WLAN 130a is switched. The PDG 129 will be in the middle of the call path after the handover.

Steps 602-616 are the same as corresponding steps 502-516 of process 500 and will not be repeated herein. After receiving the relocation request from the AP 132a, the PDG 129 sends a tunnel establishment request to the GGSN 128 and the GGSN 128 responds with a tunnel establishment response (steps 618, 620). At such point a tunnel is established between the PDG 129 and the GGSN 128. The GGSN 128 establishes the SIP connectivity to the IMS 150 through the PDG 129 (steps 622, 624). The PDG 129 sends a relocation response to the AP 132a (step 626). The AP 132a then releases the resources at step 629 after sending a handover complete message to the WTRU 102 (step 628). The GGSN 128 also sends the handover complete message for resource allocation to the Node-B 112 via the SGSN 122 (steps 630, 632). The Node-B 112 then sends the handover complete message to the WTRU 102 (step 634). The services from the IMS 150 are then provided through the UMTS network, (i.e., from the IMS 150 via the PDG 129, the GGSN 128, the SGSN 122 and the Node-B 112 to the WTRU 102 as indicated by arrows 636a-636c) (step 636).

Figure 7:
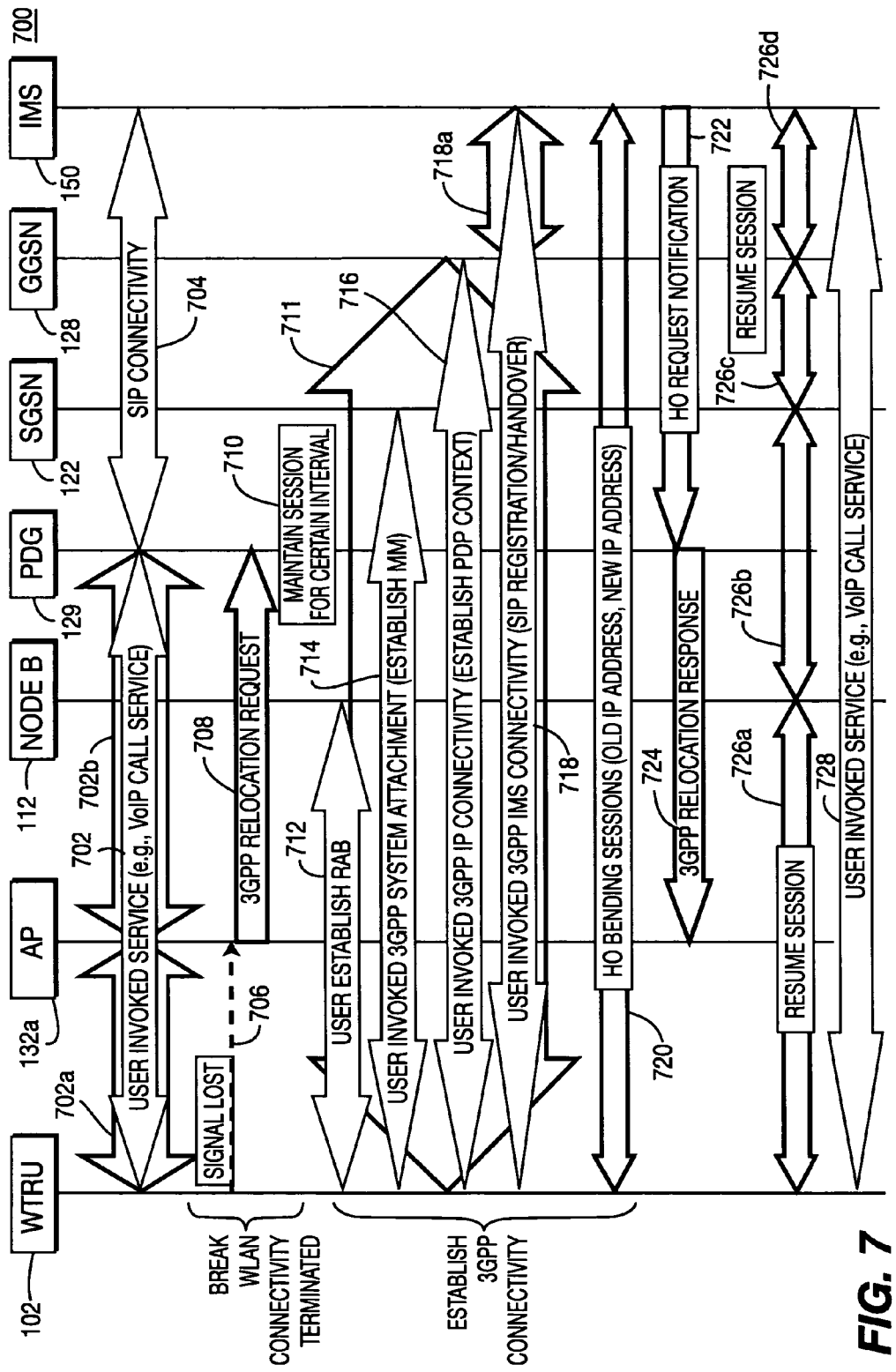
FIG. 7 is a signaling diagram of a process for interworking in accordance with a third embodiment of the present invention.

FIG. 7 is a signaling diagram of a process 700 for interworking in accordance with a third embodiment of the present invention. In accordance with the third embodiment, the existing connectivity to the WLAN 130a is torn down before handover to the UMTS network 110, (i.e., "break before make"). After the tunnel between the WTRU 102 and the PDG 129 is established, the WTRU 102 invokes the indicated service (step 702). To invoke the indicated service, the WTRU 102 sends a request to the AP 132a (step 702a) and the AP 132a forwards the request to the PDG 129 (step 702b). The step 704 between the PDG 129 and the IMS 150 indicates the steps taken place to establish the connection between the PDG and the IMS, such as SIP registration, allocation of P-CSCF and the allocation of S-CSCF.

As the WTRU 102 moves away from the current WLAN hotspot 130a, as shown in FIG. 1, handover from the current WLAN hotspot 130a to the UMTS network 110 is performed.

In accordance with this embodiment, a new connectivity to the UMTS network 110 is established after breaking the existing connectivity to the current WLAN hotspot 130a, (e.g., loss of signal).

When the signal from the AP 132a is lost (step 706), the WTRU may initiate the handover to the UMTS system or alternatively the WLAN may initiate the handover. Since the WLAN is connected to the PDG 129, the WLAN may initiate the handover to the target UMTS system. When the signal loss is detected, the AP 132a sends a message, (a relocation request), to the PDG 129 (step 708). The session is then maintained for a certain interval (step 710).

The WTRU 102 then establishes a connection to the GGSN 128 as indicated by arrow 711 by the following steps 712-716. The WTRU 102 establishes an RAB to a Node-B 112 (step 712) and invokes a 3GPP system attachment (step 714). The WTRU 102 then invokes 3GPP IP connectivity by establishing a PDP context (step 716). When the WTRU 102 sets up a PDP context, the WTRU 102 selects an access point and an APN is determined. The APN is used in a DNS query. This process finally gives an IP address of the GGSN 128 which serves the access point. The WTRU 102 then invokes 3GPP IMS connectivity through SIP registration at step 718, at such point the connection between the GGSN 128 and the IMS 150 is also established as indicated by arrow 718a.

A handover bending session is then initiated (step 720). The WTRU 102 sends the information related to the existing session to the IMS 150, (i.e., SIP server). The information includes the session/service identification, originating and terminating IP addresses, a request to redirect the traffic to the UMTS system with the new contact information, (i.e., current IP address), or the like. The IMS 150 then updates the new routing of the call/session. The IMS 150 establishes a new P-CSCF and S-CSCF for the new session.

The IMS 150 then sends a handover request notification to the PDG 129 with information regarding the session and indications that the call/session has been redirected and resources previously reserved should be released (step 722). The PDG 129 then sends a relocation response to the AP 132a along with the session information and WTRU identity (step 724). The AP 132a then releases resources allocated for the WTRU 102. The session is resumed between the WTRU 102 and the IMS 150 (steps 726a-726d) and user invoked services are provided from the IMS 150 via the GGSN 128, the SGSN 122 and the Node-B 112 to the WTRU 102 (step 728).

The PDG 129 may indicate a handover to the IMS 150. Alternatively, the WTRU 102 may indicate the handover to the IMS 150 and provide the old connection information.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU), the method comprising:
    obtaining the address of a packet data gateway (PDG) using Domain Name Service (DNS);
    registering with a Third Generation Partnership Project (3GPP) IP multimedia subsystem (IMS) via a Wireless Local Area Network (WLAN) using Session Initiation Protocol (SIP);
    invoking an IP session for a user service from the IMS;
    receiving the user service from the IMS via the WLAN and a tunnel between the PDG and the WTRU;
    initiating a handover from the WLAN to a cellular network; and
    performing the handover from the WLAN to the cellular network,
    wherein the performing the handover includes:
        maintaining a connection to the WLAN while simultaneously maintaining a connection to the cellular network; and
        continuously receiving the user service from the IMS.

2. The method of claim 1 further comprising:
    disconnecting from the PDG in response to completion of the handover.

3. The method of claim 1 further comprising:
    terminating a connection to the WLAN in response to establishing a connection to the cellular network.

4. The method of claim 1 wherein the user service is a voice call service.

5. The method of claim 1, wherein the obtaining the address of the PDG using DNS includes:
    sending a DNS query for the address of the PDG; and
    receiving a response to the DNS query, the response including the address of the PDG.

6. A wireless transmit/receive unit (WTRU) comprising:
    at least one transceiver configured to:
        obtain the address of a packet data gateway (PDG) using a Domain Name Service (DNS);
        register with a Third Generation Partnership Project (3GPP) IP multimedia subsystem (IMS) via a Wireless Local Area Network (WLAN) using Session Initiation Protocol (SIP);
        invoke an IP session for a user service from the IMS; and
        receive the user service from the IMS via the WLAN and a tunnel between the PDG and the WTRU.
    a handover controlling entity configured to initiate a handover from the WLAN to a cellular network;
    wherein the at least one transceiver is configured to perform the handover from the WLAN to the cellular network, wherein the at least one transceiver is configured to perform the handover by maintaining a connection to the WLAN while simultaneously maintaining a connection to the cellular network and continuously receiving the user service from the IMS.

7. The WTRU of claim 6 wherein the at least one transceiver is further configured to disconnect from the PDG in response to completion of the handover.

8. The WTRU of claim 6 wherein the at least one transceiver is configured to terminate a connection to the WLAN in response to a establishing a connection to the cellular network.

9. The WTRU of claim 6 wherein the user service is a voice call service.

10. The WTRU of claim 6, wherein the transceiver obtains the address of the PDG using DNS by transmitting a DNS query for the address of the PDG and receiving a response to the DNS query, the response including the address of the PDG.

* * * * *

UNITED STATES PATENT AND TRADEMARK OFFICE
CERTIFICATE OF CORRECTION

PATENT NO. : 8,130,718 B2
APPLICATION NO. : 11/285684
DATED : March 6, 2012
INVENTOR(S) : Kamel M. Shaheen Page 1 of 1

It is certified that error appears in the above-identified patent and that said Letters Patent is hereby corrected as shown below:

At Claim 8, column 8, line 52, after "response to", delete "a".

Signed and Sealed this
Second Day of April, 2013

Teresa Stanek Rea
*Acting Director of the United States Patent and Trademark Office*